United States Patent [19]

Takahashi et al.

[11] Patent Number: 5,144,350
[45] Date of Patent: Sep. 1, 1992

[54] PHOTOGRAPHIC FILM CARTRIDGE

[75] Inventors: Koichi Takahashi; Kazuo Okutsu; Hisashi Takahashi; Masuhiko Hirose; Haruo Ichikawa; Kuniharu Kitagawa; Hideaki Kataoka, all of Minami-ashigara-shi, Japan

[73] Assignee: Fuji Photo Film Co., Ltd., Kanagawa, Japan

[21] Appl. No.: 672,754

[22] Filed: Mar. 22, 1991

Related U.S. Application Data

[63] Continuation of Ser. No. 472,521, Jan. 30, 1990, abandoned.

[30] Foreign Application Priority Data

Jan. 31, 1989 [JP] Japan .................... 1-21862
Aug. 24, 1989 [JP] Japan .................... 1-218172
Jan. 12, 1990 [JP] Japan .................... 2-5251

[51] Int. Cl.⁵ .............................. G03B 17/26
[52] U.S. Cl. ........................... 354/275; 242/71
[58] Field of Search ............ 354/275; 352/78 R; 206/389, 408, 409; 242/71, 71.1, 71.2

[56] References Cited

U.S. PATENT DOCUMENTS

| 4,002,517 | 1/1977 | Edelman et al. | 352/78 R |
| 4,291,966 | 9/1981 | Bendoni et al. | 242/71.1 |
| 4,407,579 | 10/1983 | Huff | 354/275 |
| 4,445,768 | 5/1984 | Gold | 354/275 |
| 4,846,418 | 7/1989 | Fairman | 242/71.1 |

Primary Examiner—L. T. Hix
Assistant Examiner—David M. Gray
Attorney, Agent, or Firm—Sughrue, Mion, Zinn Macpeak & Seas

[57] ABSTRACT

This invention relates to a photographic film cartridge including a spool, a film wound into a roll on the spool with one end connected with the spool, and a cartridge case, the spool extending substantially coaxially with respect to the cartridge case and being carried at the opposite end portions by the opposite end walls of the cartridge case for rotation about the longitudinal axis of the spool, the cartridge case being provided with a film outlet through which the film is fed out and a shielding material on inner surfaces of the film outlet for keeping the interior of the cartridge case shielded from external light, characterized in that at least one adhesive material is provided for detachably adhering a winding of the roll of film to an adjacent winding of the roll of the film.

4 Claims, 6 Drawing Sheets

PHOTOGRAPHIC FILM CARTRIDGE

This is a continuation of Application Ser. No. 07/472,521 filed Jan. 30, 1990 now abn.

BACKGROUND OF THE INVENTION

The present invention relates to a film cartridge, and particularly to a film cartridge including a roll of film wound on a spool.

DESCRIPTION OF THE PRIOR ART

Conventionally, as film has not been tightly wound into a roll on a spool housed in a cartridge but loosely wound on a spool, the tip end of the film could not be fed outside the cartridge even if the spool was made to rotate in the direction opposite to film-winding direction. Therefore, the film leader has been pulled out of the cartridge by a certain length in advance and the photographer had to engage the film leader with a film-feeding mechanism in the camera.

However, such the operation of engaging the film leader not only is bothersome but is also sometimes done improperly because some skill is necessary for the operation. In such a case, the leader is sometimes pulled out from the film outlet more than needed so that a portion of the unexposed film is brought outside of the cartridge and exposed. Therefore, a camera not requiring such a troublesome operation has been desired.

OBJECT AND SUMMARY OF THE INVENTION

Such a camera can be obtained by enabling a film to be fed outside a cartridge from the inside thereof. In such a camera, after feeding the tip end of the film out of the cartridge, the tip end of the film can be engaged with a film-feeding mechanism of the camera so that the aforementioned bothersome operation is no longer necessary.

It is therefore the object of the present invention to provide a film cartridge capable of feeding a film outside a cartridge from the inside thereof.

According to the present invention, the aforementioned object can be accomplished by a photographic film cartridge comprising: a cartridge case having a longitudinal axis and opposite end walls; a spool extending substantially coaxially with respect to said cartridge case and carried at the opposite end portions by the opposite end walls of the cartridge case for rotation about the longitudinal axis of the spool; a film wound into a roll on said spool with one end of the film connected with the spool; adhesive means for detachably adhering the surface of one winding of the roll of film to the surface of a neighboring winding of the roll of film, the spool being capable of being rotated from the outside of the cartridge case, the cartridge case including a film outlet through which the film is fed out and a shielding material for keeping the interior of the cartridge shielded from external light.

In a preferred embodiment of the present invention, a plurality of adhesive means are provided on the surface of the same winding of the roll or on the surfaces of a different winding of the roll.

In another preferred embodiment of the present invention, a tip end of the film is housed inside the cartridge case.

In another preferred embodiment of the present invention, the adhesive force of said adhesive means falls in the range of from 0.07X kg to 15 kg where X is the magnitude of the loop stiffness of the photographic film.

According to the present invention, the above object can be accomplished also by a photographic film cartridge comprising: a cartridge case having a longitudinal axis and opposite end walls; a spool extending substantially coaxially with respect to the cartridge case and carried at the opposite end portions by said opposite end walls of said cartridge case for rotation about the longitudinal axis of the spool; a film wound into a roll on said spool with one end of the film connected with the spool; rib means for pressing the outermost surface of the roll of the film which is provided on an inner wall of the cartridge case at least partially along the circumference thereof, the spool being capable of being rotated from the outside of the cartridge case, the cartridge case including a film outlet through which the film is fed out and a shielding material for keeping the interior of the cartridge shielded from external light.

In a preferred embodiment of the present invention, a cartridge is produced so that the interval between the innermost surface of the roll of film and the outer surface of the spool is less than 2 mm.

In another preferred embodiment of the present invention, the tip end of the film is stored inside the cartridge case.

In another preferred embodiment of the present invention, the diameter of the spool is varied in accordance with the length of the film so that the interval is kept less than 2 mm.

As the roll of the film can be kept tightly wound on the spool by means of the adhesive means, the film can be fed outside the cartridge case by rotating the spool in the direction opposite to the film-winding direction.

The adhesive means should have adhesive force within a certain range so as to feed the film outside the cartridge case. This range is determined in such a way that the adhesive force is greater in magnitude than the resilient force acting to loosen the roll of film tightly wound on the spool so as to keep the film tightly wound on the spool in the case that the spool is not rotated, but less than the force caused by rotation of the spool for releasing adhesion between surfaces of the film.

Figure 2:
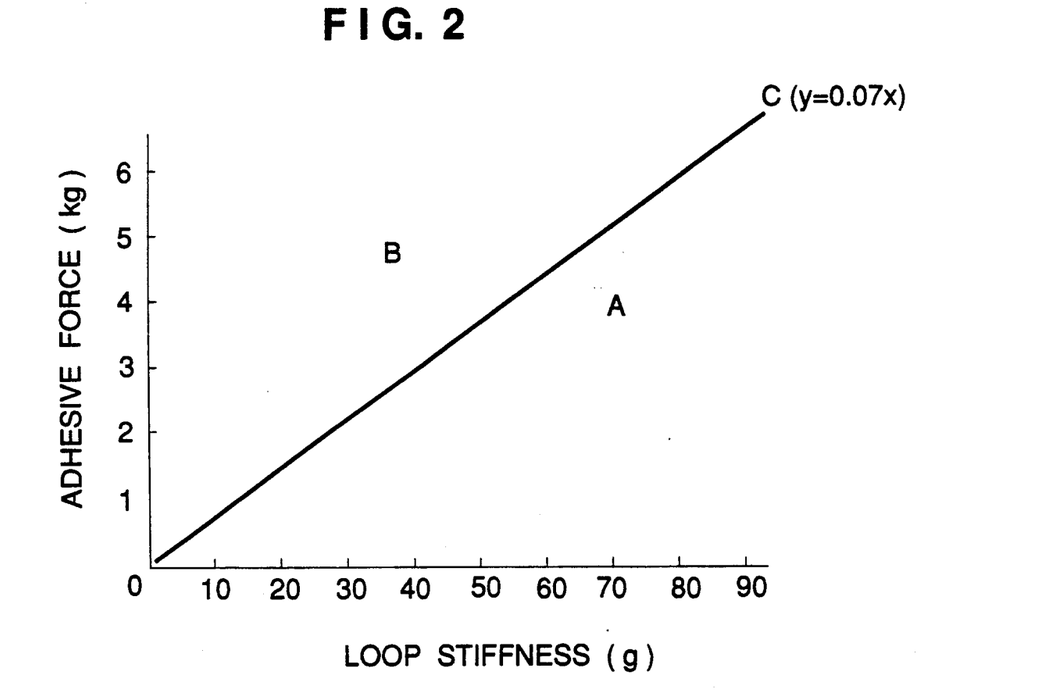
FIG. 2 is a graphic representation showing the relation between the magnitudes of adhesive force and loop stiffness.

The inventors conducted an experiment concerning the relationship between the magnitudes of the loop stiffness of the film and the adhesive force in order to determine said range. As a result, the equation shown below and represented in FIG. 2 was obtained.

$$F = 0.07X$$

where F is the magnitude of the adhesive force, and X is the magnitude of the loop stiffness of the film.

The magnitude of the loop stiffness is determined as follows. A film formed into a loop is pressed by pressurizing means so that the loop is turned into an oval shape. The loop stiffness is equal to the pressure when the pressurizing means has advanced by a certain distance, that is the pressure when the loop-shaped film has been deformed by a certain distance in the pressure force acting direction. The loop stiffness indicates the magnitude of the resilience of the film. For instance, commercially available photographic film having TAC (Triacetyl cellulose) as the film base and measuring 120 $\mu$m in thickness has a loop stiffness of about 86 g.

In FIG. 2, in the case that the point indicating the magnitudes of the adhesive force caused by the adhesive means and the loop stiffness is located in the area A, the film surface adhered to each other by the adhesive means naturally strips off and the roll of the film loosens. In the case that the point is located in the area B, the adhesive force overcomes the resilient force acting to loosen the roll of film so that the roll of film is prevented from being loosened. In the case that the point is located on the line C which represents the equation y=0.07x, the adhesive force is equal to the resilient force so that the roll of film is prevented from being loosened.

Therefore, the adhesive means should have an adhesive force greater than 0.07x kg.

Figure 3:
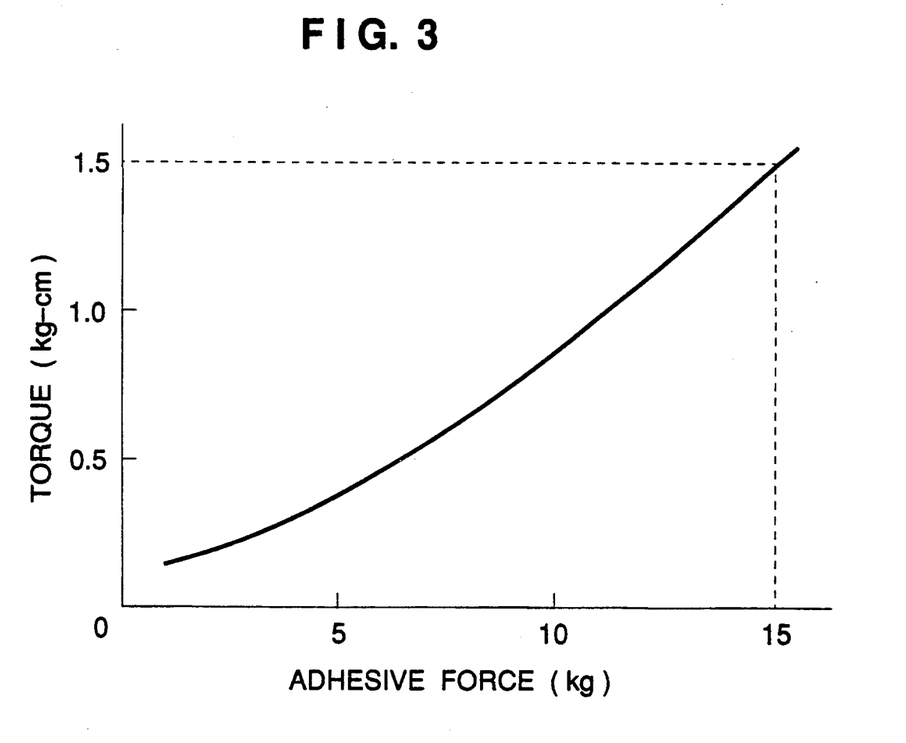
FIG. 3 is a graphic representation showing the relation between the magnitudes of the torque for rotating a spool and the adhesive force.

On the other hand, the magnitude of torque for rotating the spool should be considered in order to determine the maximum permissible adhesive force of the adhesive means. The relation between the adhesive force and the torque is shown in FIG. 3. In general, the torque produced by a camera for rotating a spool is 1.5 kg-cm at most. From FIG. 3, a torque of 1.5 kg-cm corresponds to an adhesive force of 15 kg. This means that if the adhesive force exceeds 15 kg in magnitude, the torque produced by a camera cannot release the adhesion between the film surfaces. Therefore, the adhesive force of the adhesive means should be less than 15 kg.

Figure 6:
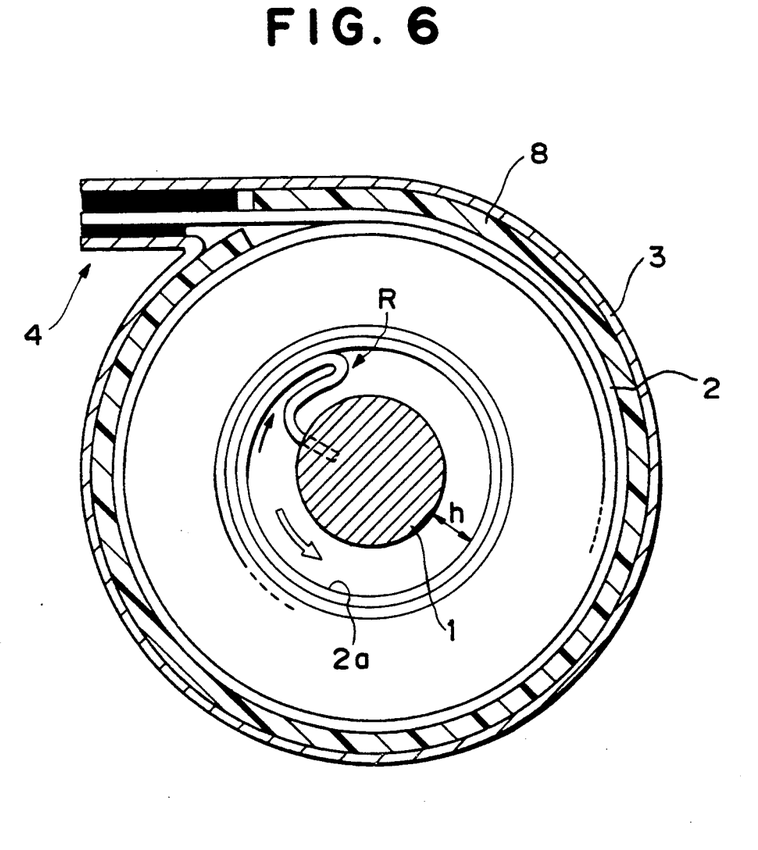
FIG. 6 is a cross-sectional view of a film cartridge wherein an inversion of the innermost surface of the roll of film has occurred.

FIG. 6 illustrates a photographic film cartridge including rib means 8 which presses the outermost surface of a roll of a film 2 housed in a cartridge case 3 so as to keep the film 2 tightly wound on a spool 1.

The rib means 8 is desired to have substantially proper design length such as an inner diameter of the cartridge case 3, thickness of the rib means 8, an outer diameter of the spool 1 and so on, in order to keep the film 2 tightly wound on the spool 1. However, considering dimensional distortion of the cartridge case 3, it is difficult to keep the film 2 tightly wound on the spool 1 with the innermost surface 2a of the roll kept in contact with the spool 1. It sometimes is impossible to avoid loosening of the innermost surface 2a of the roll of the film 2 loosens to a certain distance from the spool 1.

If the interval h between the innermost surface 2a and the spool 1 caused by loosening of the surface 2a is small, the film 2 can be fed outside the cartridge case 3 through the film outlet 4 by rotating the spool 1 in the direction opposite to the film-winding direction. However, if the interval h is large, an inversion R of the film 2 occurs between the innermost surface 2a and the spool 1 when the spool 1 is rotated. As shown in FIG. 6, the inversion R of the film 2 means gradual deforming of the surface 2a made in the direction opposite to the spool-rotating direction which is clockwise if the spool 1 is made to rotate in the counterclockwise direction. The inversion of the innermost surface 2a prevents the film 2 from being fed outside the cartridge case through the film outlet 4 because the rotation of the spool 1 cannot be transmitted to the roll of the film 2.

Figure 4:
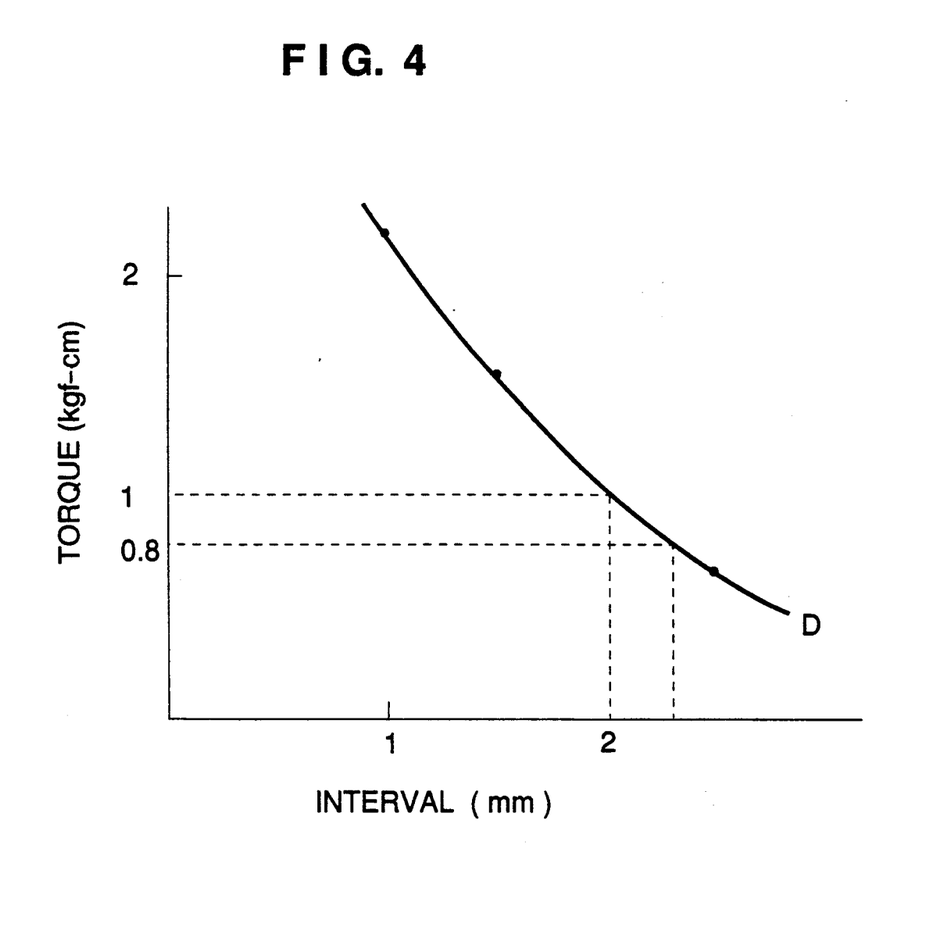
FIG. 4 is a graphic representation showing the relation between the magnitude of the torque when an inversion occurred and the interval between the innermost surface of the roll of film and the spool.

An experiment was conducted to learn the relation between the torque for rotating the spool 1 and the interval h at the time when the inversion occurs. The result of the experiment is shown in FIG. 4. In conducting the experiment, the interval h was varied depending on the lengths of the film. The film cartridge used in this experiment included a cartridge case whose inner diameter was 20 mm, spool whose outer diameter was 9 mm and a film having a width of 35 mm. In FIG. 4, the curve D indicates the boundary value of the torque for rotating the spool within which a film can be fed out without occurrence of film inversion. The curve D shows the boundary torque is approximately 1 kgf-cm when the interval h is 2 mm, for instance. Therefore, when the torque comes to be more than 1 kgf-cm in the case that the interval is 2 mm, inversion of the film shown in FIG. 6 occurs. In other words, the inversion does not occur if the interval is set to be less than 2 mm in the case that the torque is 1 kgf-cm.

Another experiment indicated that a torque of 0.8 kgf-cm is necessary for feeding the film tightly wound on the spool by rotating the spool in the direction opposite to the film-winding direction. When a 0.8 kgf-cm torque acts on the spool, the interval wherein the film can be fed out without occurence of an inversion of the film is less than about 2.3 mm from FIG. 4. Therefore, the interval is desired to be less than 2 mm in order to surely feed the film outside the cartridge case without occurrence of inversion.

In addition, an interval of such degree can absorb dimensional distortion in the inner diameter of a cartridge case, the rib thickness and so on.

The length of a photographic film varies depending on the number of frames and, may be, for example, 12, 24 or 36. Therefore, the interval would vary depending on the length of the film loaded in a cartridge case of the same size and having ribs of the same size thickness and spools of the same diameter. In this case, it is not preferable from the point of manufacturing cost to change the size of the cartridge case, so that it is preferable to decrease the diameter of the spool so as to maintain the interval less than 2 mm.

An experiment was conducted as to feeding the film with the interval changed variously in order to confirm the above. The interval was varied by changing the diameters of the spool in accordance with the length of the film. The cartridge case used in this experiment had an inner diameter of 20 mm when rib means was included, and a 35 mm-width film. The result of this experiment is shown in following table.

| No. | Length of films | Spool diameter | Intervals |
| --- | --- | --- | --- |
| 12 | 730 [mm] | 13 [mm] | 1.5 [mm] |
| 24 | 1190 | 9 | 1.8 |
| 36 | 1650 | 6 | 1.3 |

Thus, the torque for rotating the spool was measured on the condition that the interval was kept less than 2 mm. As a result, in all cases the torque necessary for feeding a film out was 0.8 kgf-cm at most and the torque when a film niversion occurred was at least 1.2 kgf-cm. The film could be fed out without inversion in every case.

The aforementioned object and advantageous features of the present invention will become apparent from the following description made with reference to the attached drawings.

BRIEF DESCRIPTION OF THE DRAWINGS

FIG. 5b is a front view in the direction shown an arrow A in FIG. 5a.

DETAILED DESCRIPTION OF PREFERRED EMBODIMENTS

Figure 1:
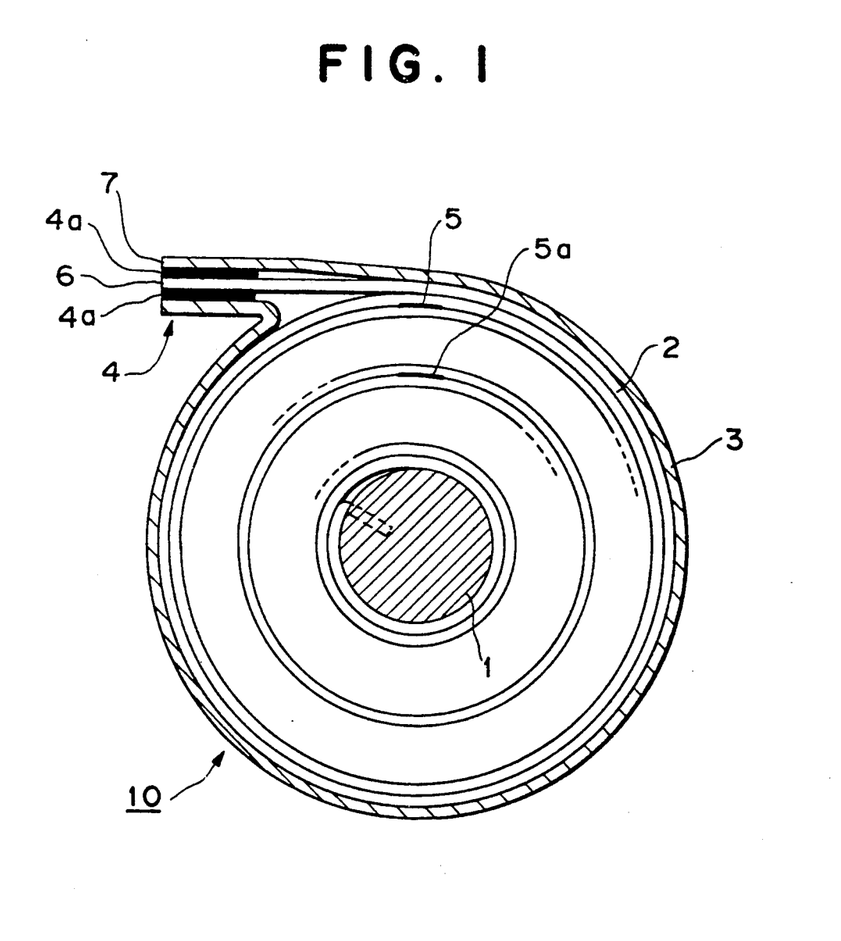
FIG. 1 is a cross-sectional view of a film cartridge in accordance with the present invention.

FIG. 1 illustrates a film cartrige in accordance with the present invention. The photographic film cartridge 10 comprises a spool 1, a film 2 wound into a roll on the spool 1 with an end connected with the spool 1 and a cartridge case 3. The spool 1 extends substantially coaxially with respect to the cartridge case 3 and is carried at the opposite end portions by the opposite end walls of the cartridge case 3 for rotation about the longitudinal axis of the spool 1. The cartridge case 3 is provided with a film outlet 4 through which the film 2 is fed out and a shielding material 4a on inner surfaces of the film outlet 4 for keeping the interior of the cartridge case 3 shielded from external light.

A roll of film 2 has an adhesive means 5 for adhering an inner surface at the end of the first winding, i.e. the outermost winding, to the outer surface at the end of the second winding and an adhesive means 5a for adhering an inner surface at the end of the Nth winding to the outer surface at the end of the (N+1)th winding where N is a positive integer larger than 2. The roll of film 2 can be kept tightly wound on the spool 1 by means of the adhesive means 5 and 5a. The adhesive means 5 and 5a are arranged to have an adhesive force which is larger than 0.07X kg but less than 15 kg in magnitude where X is the magnitude of the loop stiffness.

A tip end 6 of the film 2 is arranged to be located in alignment with the film outlet 4 so that the tip end of the film 2 does not adhere to the adjacent surface of the roll of film 2. The tip end 6 of the film 2 may be housed in the cartridge case 3 or be located in the vicinity of the film outlet 4.

A rubber comprised of mixture of polyisobutylene, polyethylene and liquid paraffin, polyvinylidene chloride, non-rigid vinyl chloride, urethane, rubber and other adhesive materials may be used as the adhesive means. In addition, double-coated adhesive tape or a heat seal may, for instance, also be used. Alternatively, the surfaces of the film may be adhered to each other by attaching a thin plastic film having strong adherence to the surface of the film or planishing the surface of the film.

This film cartridge is used as follows. Initially, the film cartridge is loaded into a film compartment in a camera. In this operation, a film leader which is pulled in advance out of the cartridge by a certain length is no longer necessary to be engaged with a film-feeding mechanism of the camera. All that need be done is to merely load the film cartridge into the camera. Thereafter, a film-feeding mechanism (not shown) rotates the spool 1 in the direction opposite to the film-winding direction. Since the roll of the film 2 is kept tightly wound on the spool 1, the rotation of the spool 1 causes the tip end 6 of the film 2 to advance, so that the portion of the film 2 located between the tip end 6 and the adhesive means 5 is fed outside the cartridge case 3 through the film outlet 4. Then, the tip end 6 of the film 2 engages with the film-feeding mechanism (not shown) of the camera.

If the tip end 6 of the film 2 is arranged to be located in alignment with the tip end 7 of the film outlet 4, the length of the portion of the film 2 to be fed out can be controlled by controlling the number of the rotations of the spool 1, which makes the tip end 6 of the film 2 easy to be engaged with the film-feeding mechanism of the camera.

Though the roll of film 2 is still kept tightly wound on the spool 1 by means of the adhesive means 5 and 5a, the adhesion caused by the adhesive means between the surfaces of the film is released by rotation of the spool 1.

After the tip end 6 of the film 2 is engaged with the film-feeding mechanism of the camera, the feeding-mechanism feeds the film 2 to an exposure area in the camera.

In the case that the cartridge includes a plurality of adhesive means for adhering the surfaces of the film as shown in the embodiment, even if the adhesion caused by the adhesive means 5 is released, the portion of the roll of film 2 between the (N+1)th winding and the spool 1 is still kept tightly wound on the spool 1 by means of the adhesive means 5a. Therefore, said portion of the roll of film 2 can be controlled in length to be fed out by controlling the number of the rotations of the spool 1. Needless to say, a single adhesive means can also feed the film out.

Figure 5A:
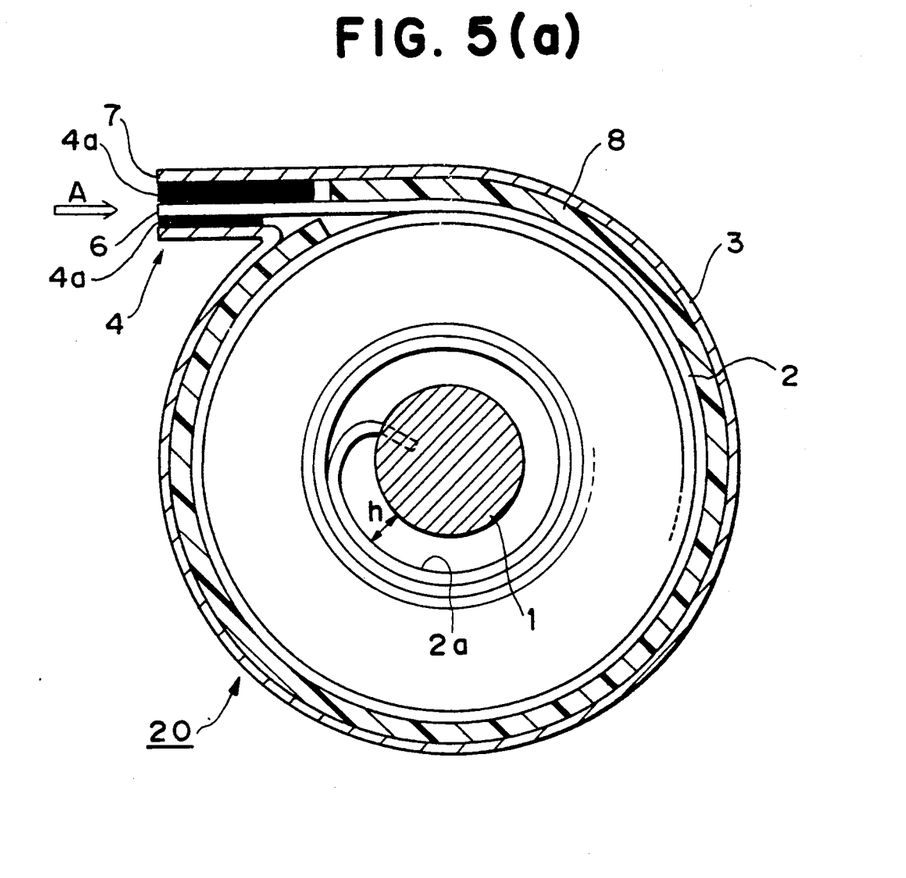
FIG. 5a is a cross-sectional view of a film cartridge wherein including rib means.
Figure 5B:
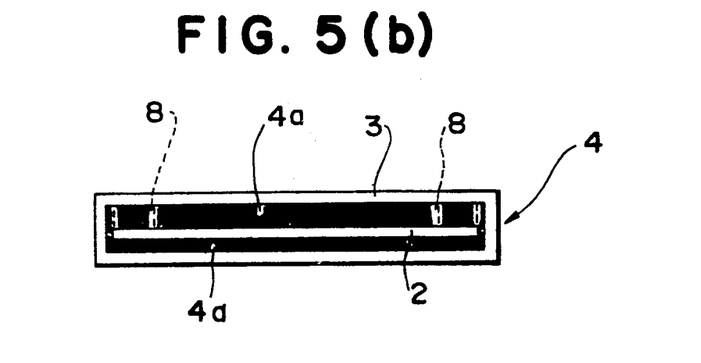

FIGS. 5a and 5b illustrate an another embodiment. The photograph film cartridge 20 comprises a spool 1, a film 2 wound into a roll on the spool 1 with an end connected with the spool 1 and a cartridge case 3. The spool 1 extends substantially coaxially with respect to the cartridge case 3 and is carried at the opposite end portions by the opposite end walls of the cartridge case 3 for rotation about the longitudinal axis of the spool 1. The cartridge case 3 is provided with a film outlet 4 through which the film 2 is fed out and a shielding material 4a on innner surfaces of the film outlet 4 for keeping the interior of the cartridge case 3 shielded from external light.

As shown in FIG. 5b, the film cartridge 20 is provided at both edges of the film 2 with a pair of ribs 8 which circumferentially extend along an inner surface of the cartridge case 3 and are of a width equal to about 15% through 20% of the width of the film. The ribs 8 are arranged to make an opening in alignment with the film outlet 4 so that the film 2 can be fed therethrough. The tip end 6 of the film 2 is arranged to be located in alignment with the tip end 7 of the film outlet 4.

The ribs 8 keep in contact with the outermost surface of the roll of film 2 to press the roll so that the film 2 is kept tightly wound on the spool 1.

The outer diameter of the spool 1 is determined as follows. As mentioned earlier, it is difficult to keep the film 2 tightly wound on the spool 1 with the innermost surface 2a of the film 2 kept in contact with the outer surface of the spool 1. It is impossible to avoid an interval from being produced between the innermost surface 2a and the spool 1. As mentioned earlier, when the interval h between the innermost surface 2a and the spool 1 is large, inversion of the film 2 occurs as shown in FIG. 6. Therefore, the outer diameter of the spool 1 is determined in such a way that the interval h is less than 2 mm. In other words, if 'a' indicates the outer diameter of a spool, 'b' indicates the inner diameter of the cartridge case, 't' indicates the thickness of the ribs, 'c' indicates the thickness of the film and 'd' indicates winding number of the roll of film, which varies depending on the length of the film, the following equation is obtained:

$$b/2 = a/2 + h + cd + t$$

Accordingly,
$$a/2 = b/2 - t - h - cd$$

The interval h can be obtained by the following equation:

$$h = b/2 - a/2 - cd - t$$

Therefore, the outer diameter 'a' in the case of $h \leq 2$ is:

$$b/2 - t - cd - 2 \leq a/2$$

Inversion of the film 2 can be avoided on the condition that the interval h is caused to be less than 2 mm and the torque for rotating the spool is caused to be less than 0.8 kgf-cm.

The ribs 8 need not necessarily be formed circumferentially over the entire inner surface of the cartridge case 3, but may be formed only over a part of the circumference. In addition, the ribs 8 may be formed over the entire film width.

The material of the ribs is selected so as not to scratch the film. Plastics are preferable. A material having resilience to some extent such as urethane may be selected. The thickness of the ribs made of urethane is determined so that the ribs are contracted when a film tightly wound on a spool is loaded into a cartridge case. Since the outermost surface of the roll of film is kept pressed by the resilient force caused by the constracted ribs, the film 2 can be kept tightly wound on the spool after an outer diameter of the roll of film decreases as the film is fed out.

In both embodiments aforementioned, shielding means for shielding the interior of the cartridge case from external light may be replaced with other means. Instead of the felt means in the embodiments, the film outlet may be arranged to be able to open and close. The film outlet is kept closed when not in use. The tip end 6 of the film 2 need not necessarily be arranged in alignment with the tip end 7 of the film outlet 4. Though it is sufficient for the tip end 6 to be housed in the cartridge case 3, it is desirable to be located in the film outlet.

As mentioned earlier with respect to the preferred embodiments, according to the present invention, a photographic film cartridge can be obtained which can feed a film outside the cartridge by rotating a spool in the direction opposite to the film-winding direction.

Since the film fed out from the cartridge engages with a film-feeding mechanism of the camera, such an operation as engaging a film leader with the film-feeding mechanism of the camera is no longer necessary. Thus, a film cartridge can be loaded into a camera only by an easy operation like loading a battery into a camera.

As a result, it is no longer necessary to open the entire back cover of the camera to load a film cartridge into the camera. A film cartridge can be loaded into the camera only by opening a part of a back cover. Therefore, such secondary effects can be obtained as a improved camera designability and a lower cost.

The present invention has thus been shown and described with reference to specific embodiments. However, it should be noted that the present invention is in no way limited to the details of the described arrangements but all alternatives, modifications, and equivalents may be included within the spirit and scope of the invention as defined in the claims.

What is claimed is:

1. A photographic film cartridge comprising: a spool; a film wound into a roll on said spool with one end connected with said spool; and a cartridge case, said spool extending substantially coaxially with respect to said cartridge case and being carried at opposite end portions by opposite end walls of said cartridge case of rotation about a longitudinal axis of said spool, said cartridge case being provided with a film outlet through which an end of said film is fed out of said cartridge and a shielding material on inner surfaces of said film outlet for keeping the interior of said cartridge case shielded from external light wherein said cartridge includes means for enabling said film to be conveyed through said film outlet when said spool is rotated in the unwinding direction, said enabling means including a plurality of adhesive means including an adhesive substance for detachably, adhesively adhering a winding of the roll of film to an adjacent winding of the roll of film, said spool being capable of being rotated in the unwinding direction from outside of the cartridge thereby advancing said film.

2. A photographic film cartridge in accordance with claim 1 wherein a tip end of said film is housed in said cartridge case.

3. A photographic film cartridge in accordance with claim 1 wherein said adhesive means has an adhesive force greater than 0.07X kg but less than 15 kg, where X is a loop stiffness of said film.

4. A photographic film cartridge comprising: a spool; a film wound into a roll on said spool with one end connected with said spool; and a cartridge case, said spool extending substantially coaxially with respect to said cartridge case and being carried at opposite end portions by opposite end walls of said cartridge case of rotation about a longitudinal axis of said spool, said cartridge case being provided with a film outlet through which an end of said film is fed out of said cartridge and a shielding material on inner surfaces of said film outlet for keeping the interior of said cartridge case shielded from external light wherein said cartridge includes means for enabling said film to be conveyed through said film outlet when said spool is rotated in the unwinding direction, said enabling means including a plurality of adhesive means for detachably, adhesively adhering a winding of the roll of film to an adjacent winding of the roll of film, said spool being capable of being rotated in the unwinding direction from outside of the cartridge thereby advancing said film, wherein one of said adhesive means adheres an inner surface at the end of the Nth winding to the outer surface at the end of the (N+1th) winding, where N is a positive integer larger than 2, and wherein the outermost winding corresponds to N=1.

* * * * *